United States Patent [19]

Lane et al.

[11] E Re. 30,233

[45] Reissued Mar. 18, 1980

[54] MULTIPLE LAYER DECORATED PAPER, LAMINATE PREPARED THEREFROM AND PROCESS

[75] Inventors: William C. Lane, Chillicothe, Ohio; Donald E. Moffatt, Lee, Mass.

[73] Assignee: The Mead Corporation, Dayton, Ohio

[21] Appl. No.: 600,154

[22] Filed: Jul. 29, 1975

Related U.S. Patent Documents

Reissue of:

[64] Patent No.: 3,798,111
Issued: Mar. 19, 1974
Appl. No.: 237,952
Filed: Mar. 24, 1972

U.S. Applications:

[63] Continuation-in-part of Ser. No. 147,839, May 28, 1971, abandoned.

[51] Int. Cl.[2] ..... B32B 5/16

[52] U.S. Cl. ..... 428/207; 156/277; 162/181 C; 162/186; 264/132; 427/203; 427/205; 428/219; 428/288; 428/290; 428/328; 428/329

[58] Field of Search ..... 428/195, 207, 211, 329, 428/331, 323, 409, 219, 288, 290, 328; 427/203, 204, 205, 261, 288; 162/181 C, 186, 128, 126; 156/277, 279; 264/131, 132, 137

[56] References Cited

U.S. PATENT DOCUMENTS

| | | | |
|---|---|---|---|
| 1,230,095 | 6/1917 | Baum | 162/18 |
| 1,672,988 | 6/1928 | Novak | 162/188 |
| 1,953,111 | 4/1934 | Horne | 156/279 |
| 2,060,824 | 11/1936 | Rafton | 162/128 |
| 2,202,488 | 5/1940 | Graham et al. | 428/207 |
| 2,599,092 | 6/1952 | Craig | 162/128 |
| 3,123,515 | 3/1964 | Barna | 161/162 |
| 3,135,643 | 6/1964 | Michl | 428/211 |
| 3,190,786 | 6/1965 | Magill et al. | 156/279 |
| 3,223,579 | 12/1965 | Dorland et al. | 162/225 |
| 3,287,207 | 11/1966 | Treat | 162/186 |
| 3,343,975 | 9/1967 | Daneski | 161/413 |
| 3,372,084 | 3/1968 | Arledter | 162/128 |
| 3,373,070 | 3/1968 | Fuerst | 161/260 |
| 3,373,071 | 3/1968 | Fuerst | 428/451 |
| 3,445,327 | 5/1966 | Fuerst | 161/413 |
| 3,525,664 | 8/1970 | Hale et al. | 428/331 |
| 3,540,978 | 11/1970 | Ames | 428/325 |
| 3,551,241 | 12/1970 | Heeb et al. | 156/277 |
| 3,562,076 | 2/1971 | Lea | 428/331 |
| 3,661,673 | 5/1972 | Merriam | 156/297 |
| 3,716,440 | 2/1973 | Ando et al. | 161/413 |

FOREIGN PATENT DOCUMENTS 775555 12/1971 Belgium .

*Primary Examiner*—Stanley S. Silverman
*Attorney, Agent, or Firm*—Arnold, White & Durkee

[57] ABSTRACT

A decorated multiple layer paper suitable for use as a top surface in resin impregnated abrasion resistance decorated laminates, and the laminates prepared therefrom, said multiple layer having a base layer and a top layer, the top layer comprising abrasion resisting mineral particles having a hardness of 7 or more on the Moh scale and a particle size ranging from 10 to 75 microns, and with a printed pattern over the exposed surface of the top layer. The multiple layer paper is made by depositing a base layer on a paper machine forming wire, and while the base layer is in a wet state and still supported on the forming wire, depositing the top layer thereover. Abrasion resistant decorative laminates are prepared from said decorated multiple layer paper by saturating said paper with a resin, suitably a thermosetting resin followed by uniting with a core and curing of said resin.

22 Claims, 3 Drawing Figures

MULTIPLE LAYER DECORATED PAPER, LAMINATE PREPARED THEREFROM AND PROCESS

Matter enclosed in heavy brackets [ ] appears in the original patent but forms no part of this reissue specification; matter printed in italics indicates the additions made by reissue.

REFERENCE TO RELATED APPLICATION

This application is a continuation-in-part of copending application Ser. No. 147,839, filed May 28, 1971 now abandoned.

BACKGROUND OF THE INVENTION (1) Field of the invention

The present invention relates to laminates, more particularly to laminates having a high degree of abrasion resistance and suitable for table and counter tops, wall panels, floor surfacing, tableware and the like.

(2) Description of the prior art

Typically, laminates may be made from papers or fabrics by impregnating them with resins of various kinds, assembling several layers and consolidating the assembly into a unitary structure while converting the resin to a cured state. Resins used may be any selected from phenolics, aminoplasts, polyesters, polyurethanes, epoxy resins and the like. Consolidation of the layers to a unitary laminated structure may involve pressures ranging from essentially zero (with contact only between the layers comprising the final laminate) to 2000 lb. per sq. in. or more. Curing or setting of the resins may be accomplished at room temperature, or elevated temperatures (of the order of 150°-180° C.) to reduce the time required for curing.

The selection of the paper or fabric to be used, and the resin for impregnation is governed by the intended end-use of the finished laminate. For some end uses, surface decoration is not required or wanted, but in many instances colors and/or patterns are desired to add eye appeal to the finished laminate. While color and/or pattern decoration may be wanted for an outer surface of the laminate, the core or base functions primarily as a strengthening support, and may comprise wood, such as plywood, multiple layers of unbleached or dark colored paper or cloth, and may utilize dark colored, less expensive impregnating resins, such as phenolic resins.

When decorated laminates are desired, an outer surface layer, hereinafter called "decor," is used to cover the core layer or layers. This colored or decorated paper, may be pigmented with titanium dioxide and/or other opacifying pigments to mask the dark-colored core stock. The decor layer may be impregnated with a wide variety of resins, which may be applied to the decor in latex form, or as solutions in suitable solvents.

To impart wear and/or abrasion resistance to such decorated laminates, it has long been the practice to place a resin-impregnated surfacing paper, hereinafter called "overlay" over the decor sheet. Upon consolidating the laminate, generally under heat and pressure, the overlay sheet becomes transparent, permitting the printed pattern to be seen. More recently, particles of silica have been incorporated in overlay papers to give added abrasion resistance to laminates incorporating them. Likewise, printed decor papers have been coated with resin syrups containing abrasion resisting particles of silica, sometimes with added fibers or micro-crystalline cellulose. All the known prior art relating to abrasion resistant laminates applies a wear layer of some type over the printed pattern.

SUMMARY OF THE INVENTION

This invention relates to a multiple layer decor paper having abrasion-resisting mineral particles incorporated in the top layer thereof and having printing on the surface of said top layer, the paper being adapted to saturation with resins and incorporation into wear resistant decorative laminates, and to decorative laminates produced therefrom.

In one embodiment, the multiple-layer decor paper of this invention has a base layer of fibers and opacifying fillers, with a top layer comprising fibers and abrasion resistant mineral particles. An intermediate layer may be provided and contain decorative inclusions such as planchets or sequins, chopped foil or the like. The top surface of the paper is printed to provide the desired appearance, color and/or pattern desired in a completed laminate.

Typically, the abrasion resistant decorative laminates of this invention have a top surface ply of resin impregnated printed decor paper of this invention bonded to a base or core. No overlay is required. Surprisingly, even though the printing is applied on or over the top layer of the paper, and thus over the wear-resisting mineral particles incorporated therein, standard NEMA abrasion tests give wear rates well under 0.08 gm./100 cycles, and require up to 3000 cycles or more to the endpoint (this being taken as the point where one-half the printed pattern has been abraded away). By contrast, prior art laminates with conventional decor papers require the use of overlay papers to meet the NEMA Class A specification of 400 cycles and a wear rate of 0.08 gm./100 cycles.

So far as we know, no one prior to our invention has incorporated abrasion resisting mineral particles in a top layer of a multi-layer decor paper, printed over this top layer (and thus over the abrasion resisting mineral particles), and, incorporated such paper in a laminate with no overlay to achieve the desired high abrasion resistance in the finished laminate. With the decorative pattern applied over the abrasion resistant layer, it is indeed unexpected that even nominal abrasion resistance is obtained, let alone values several times greater than that prior achieved with conventional overlay papers.

Accordingly, it is an object of this invention to provide a multi-layer decor paper having abrasion resisting mineral particles incorporated in the top layer thereof, with decorative printing applied over said top layer, such printed multi-layer decor being adapted to impregnation with resins to produce abrasion resistant decorative laminates.

It is a further object of this invention to provide a decor paper having improved quality of printing applied thereto.

It is yet another object to provide abrasion resistant laminates of improved post-forming characteristics.

Another object of this invention is to provide simplified methods for producing decor papers and laminates prepared therefrom, which laminates exhibit unusually high resistance to abrasion, without the need to incorporate overlays therein.

These and other objects will become apparent from the description which follows.

DESCRIPTION OF THE INVENTION

(1) Multiple layer printed decor

Figure 1:
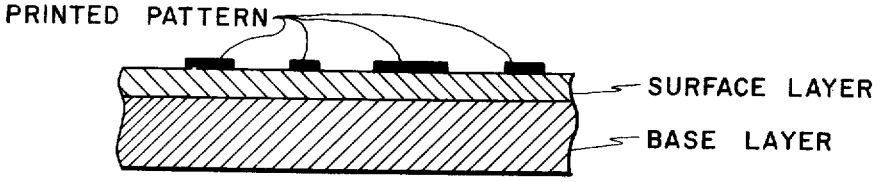
FIG. 1 is a diagrammatic, greatly enlarged elevational section through the printed, multiple layer decor paper of this invention.

The multiple layer printed decor of this invention has a base layer comprising fibers and most often, opacifying pigments such as titanium dioxide, although for some end uses of laminates where opacity of the decor is not required, the base layer may be free of opacifying pigments. Additionally, the base layer may contain strengthening agents, and formation and retention aids, all as known in the art. The weight per ream of the base layer is not critical, and may range from 10 to 100 lbs. or more per ream of 500 sheets, 24"×36" (3000 sq. ft.) A preferred range is from 30 to 100 lbs./3000 sq. ft., and very suitable opaque decors can be produced from base layers of 60 lbs./3000 sq. ft.

Such base layers are formed on the wire of a conventional paper machine having one or more secondary headboxes, with the fiber stock for the base layer delivered to the forming wire by means of a primary headbox, all as well known in the art.

To the formed, wet base layer, while still carried by the forming wire of the paper machine is added a top layer comprising abrasion resisting mineral particles. This top layer may also include fibers, and a range of mineral particles to fibers from 100% mineral particles to 5% mineral particles is useful. A preferred range is from 10% mineral particles to 50% mineral particles, with the balance made up of fibers, and excellent results are obtained with 25% mineral particles and 75% fibers. In general, the base layer must be fairly well formed but not too free of water, prior to application of the top layer, to allow the top layer components to partially mix and combine with the base layer. The dandy roll and wet presses help to accomplish the bonding together of the base and top layers, but the top layer will consist essentially of the composition as applied from the secondary headbox.

Generally speaking the mineral particles are adequately retained in the top layer by entanglement with the fibers present. However, if more positive retention is desired, a small amount of an adhesive such as starch may be incorporated in the top layer, or a thin layer of additional fibers may be applied over the top layer to intermingle and bond the mineral particles therein. Such additional fibers are suitably applied by a tertiary headbox, in an amount of the order of 2 lbs./3000 sq. ft.

Depending on the end-use properties desired in the laminates to be manufactured using the multiple layer decor of this invention, the amount of top layer applied to the base layer can range from 1 to 20 lbs./3000 sq. ft., with a preferred range of 4 to 14 lbs./3000 sq. ft. (dry basis). Excellent results are obtained with a top layer amounting to 4 to 10 lbs./3000 sq. ft. dry basis.

The abrasion resisting mineral particles comprising the top layer are selected from materials having a hardness of 7 or more on the Moh hardness scale. Such materials as silica, alumina, alundum, corundum, emery, spinel, as well as other materials such as tungsten carbide, zirconium boride, titanium nitride, tantalum carbide, beryllium carbide, silicon carbide, aluminum boride, boron carbide, diamond dust, and mixtures thereof may be used. The suitability of the abrasion resisting mineral particles will depend on such factors as availability and cost of a particular material, particle size available and color. For very light or white background colors, it is desirable to use essentially colorless mineral particles, such as alumina or silica. On the other hand, color of the mineral particles is not critical for colored decor papers, since the print patterns are applied over the surface thereof. Considering cost, availability, hardness, particle sizes available and lack of color, alumina is a preferred mineral for incorporation in the top layer.

The average particle size and particle size distribution of the mineral particles used in producing the multiple layer decor of this invention are quite important. Very fine particles of 2 microns or less, such as exhibited by the more conventional mineral fillers used in printing papers do not yield the desired high abrasion resistance in laminates. A useful range of particle size according to this invention is from 10 micron average particle size up to 75 micron average particle size. Average particle sizes much over 75 microns are coarse enough to interfere with printing detail, and may cause undue wear on caul plates. Also, fairly closely sized mineral particles are preferred to those having a wide range of particle diameters. A preferred average particle size of 40 microns has given excellent results. Alumina (Moh hardness of 9) with an average size designation of 40 microns and having the following size distribution is available from Micro Abrasives Corporation of Westfield, Mass. under the grade designation "Microgrit WCA-40" and is well-suited for our purposes:

| Size, microns: | Percent by weight |
|---|---|
| 60 and over | 4 |
| 50–60 | 17 |
| 40–50 | 29 |
| 30–40 | 38 |
| 25–30 | 12 |
| Under 25 | 0 |

As may be seen from the data, 67% of this material falls in the size range of 30 to 50 microns and 96% in the size range of 25–60 microns, and is a fairly closely sized material.

After deposition of the top layer over the base layer by means of a secondary headbox on the paper machine, the wet, double layer web is pressed, dried and may be calendered, all as known in the art, followed by application of a decorative printed pattern to the surface of the top layer to yield the multiple-layer decor paper of this invention, as shown in the diagrammatic vertical section of FIG. 1.

(2) Abrasion resistant laminate

Figure 2:
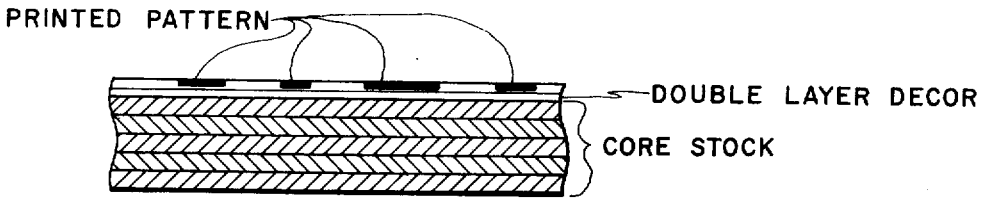
FIG. 2 is a diagrammatic, elevational section through a decorated, abrasion resistant laminate of this invention.

The decorated, abrasion resistant plastic laminate of this invention is prepared by treating or impregnating the printed multiple layer decor of FIG. 1 with a suitable resin, drying and assembling the impregnated multiple layer decor as the surface layer, printed side out over a base or core and consolidating the assembly as by use of heat and pressure to cure the resin therein. A typical resulting laminate, such as is shown in diagrammatic vertical section in FIG. 2, although it does not contain an overlay over the print surface, still exhibits excellent abrasion resistance and high quality decorative print quality, making it suitable for numerous applications where severe wear may be expected, such as furniture, table tops and counter tops, flooring and the like. This is a wholly unexpected result, since the print pattern has not been covered with a wear-resisting layer such as an overlay paper of a coating of abrasion resisting material over the print pattern.

It should be evident that the key feature of this invention centers on achieving high abrasion resistance in a finished, decorative laminate by use of a multiple layer structure in a decor surface ply, the abrasion resistance being attributable to abrasion resisting mineral particles comprising the outer surface layer of the decor, with the printed pattern applied over this surface layer. Thus, the core of the laminate may be of any desired type, and such cores as wood, particle board, plaster board, asbestos board and the like are contemplated as being within the scope of the invention, as well as the commonly used plies of unbleached kraft paper impregnated with resins such as phenol-aldehyde resins.

Similarly, the base layer of the multiple layer decor of this invention may utilize fibers of a wide variety, these being selected to impart desired properties in finished laminates to meet particular end-use requirements. For example, the base layer may comprise asbestos or glass fibers where flame resistance is desired, and synthetic organic fibers may be used, such as nylon, rayon, acrylic, polyolefin and the like.

Selection of the resin for impregnation of the multiple layer printed decor will largely be governed by the intended end use of the finished laminate. Aminoplasts such as melaminealdehyde resins, acrylics such as polyacrylonitrile, polyester resins such as diallyl phthalate, phenolic resins, polyurethanes, and epoxy resins may be used.

The various embodiments of the invention will become apparent from the examples which follow. In the examples, the laminates of the invention, which incorporate the printed multiple layer decor of the invention were evaluated for abrasion resistance according to NEMA Method DL1-2.01. Values reported are the number of abrasive cycles required to reach an end point, which is taken as the point where one-half of the decorative print pattern has been abraded away. The wear rate is reported as the weight lost by the test laminate per 100 revolutions of the abrading wheels of the test instrument, the Taber abrasor. It should be noted that accepted industry standards for Class A laminates (suitable for table and counter tops) is a minimum of 400 cycles, with a wear rate not to exceed 0.08 gm. per 100 revolutions.

Printing quality of the multiple layer decors and laminates prepared therefrom was measured by measuring the ink receptivity of the surface of the top layer. Using a proof press and a uniform halftone plate, decor samples were printed under controlled standardized conditions using a constant metered amount of black ink on the plate. Reflectance of the resulting print was measured by a reflectance measuring instrument known as a "Densichron" to give numerical values representative of the blackness of the printed image, the blacker image resulting when the decor surface layer is more receptive to ink. Accordingly, the lower the Densichron reading, the better the printed result.

EXAMPLE 1

Bleached alpha pulp was beaten to a freeness of 500 ml. (Canadian Standard) and formed on a paper machine into a base layer weighing 22 lbs./3000 sq. ft. (dry basis). To the wet base layer on the foaming wire of the paper machine was added, by means of a secondary headbox, 10 lbs./3000 sq. ft. (dry basis) of a mixture of 1 part bleached alpha pulp and 1 part 325 mesh silica (substantially 100% finer than 44 microns). The double layer decor so formed had a total basis weight of 32 lbs./3000 sq. ft. (dry basis), with a silica content of 15.6%, based on total decor, most of the silica being retained in the top layer. After pressing, drying and calendering, the exposed side of the top layer was printed with a wood grain pattern. This printed double layer decor was then impregnated with a melamine resin and assembled, with six plies of corestock, as the top ply (printed side out) of a laminate. After pressing and curing, the laminate showed an abrasion resistance of 350 cycles and a wear rate of 0.015 gm./100 cycles. By comparison, a laminate made from the decor comprising the base layer only, and having the same print pattern, had an abrasion resistance of 100 cycles and a wear rate of 0.059 gm./100 cycles. Thus, the double layer decor of this invention improved abrasion resistance by a factor of 3.5, and wear rate by a factor of almost 4.

EXAMPLES 2 THROUGH 8 INCL.

In the examples which follow, the same base layer was used throughout, as follows: 31 parts of bleached softwood pulp, 25 parts bleached hardwood pulp and 44 parts of titanium dioxide were blended and refined to a freeness of 425 to 450 ml. (Canadian Standard). This furnish included 0.25 part of a dispersing agent for the dioxide and 1.5 parts of a wet strength agent. This composition was delivered to the primary headbox of a paper machine at a rate to form a base layer of 66.3 lbs./3000 sq. ft. (dry basis). A portion of the base layer was pressed and dried without application of any top layer, for use as a control in connection with the examples representing the invention. To a further portion of the base layer, water was added by means of a secondary headbox to check on the amount of base layer washed through the paper machine wire by reason of the application of a top layer, using the same secondary headbox. The base layer prepared in this manner had a basis weight of 60.5 lbs./3000 sq. ft. (dry basis).

A fiber component for use in the top layer, in combination with various kinds of abrasion resisting mineral particles, comprised bleached hardwood pulp refined to a freeness of 425 ml. (Canadian Standard). The fiber component was mixed in various ratios with a variety of abrasion resistant mineral particles, then applied by means of a secondary headbox to the wet primary layer on the wire of the paper machine. The double layer web, in each case, was then pressed, dried and calendered. Following this, the same printed pattern was applied to the exposed side of the top layer of the several different examples.

Each of the double layer printed decors was then impregnated with a 50% solution of the same melamine-formaldehyde resin to give a 48–52% resin content and dried to a volatile content of about 6%. Laminates were then prepared by employing the resin impregnated multiple layer decors as surface sheets, printed side out, over six sheets of corestock. Pressing and curing were under the same time, temperature and pressure conditions in each case.

cases, printing quality, as judged by Densichron readings, was equal to or somewhat better than the control.

| | Control | Control plus $H_2O$ | Example 2 | 3 | 4 | 5 | 6 | 7 | 8 |
|---|---|---|---|---|---|---|---|---|---|
| Top layer composition: | | | | | | | | | |
| Hardwood fibers, percent | | | 50 | 50 | 50 | 50 | 50 | 50 | 50 |
| 40μ $Al_2O_3$, percent | | | 50 | 50 | | | | | |
| 90μ $Al_2O_3$, percent | | | | | 50 | 50 | | | |
| 40μ SiC, percent | | | | | | | 50 | | |
| 35–40μ Norbide 320[3] | | | | | | | | 50 | 50 |
| Physical properties: | | | | | | | | | |
| Basis wt., base layer | 66.3 | 60.5 | 60.5 | 60.4 | 60.5 | 60.5 | 60.5 | 60.5 | 60.5 |
| Basis wt., top layer | | | 6.5 | 8.5 | 4.6 | 5.2 | 4.4 | 6.3 | 7.8 |
| Basis wt., total | 66.3 | 60.5 | 67.0 | 69.0 | 65.1 | 65.7 | 64.9 | 66.8 | 68.3 |
| Ash, total percent | 38.6 | 38.2 | 38.8 | 38.5 | 37.4 | 36.2 | 37.3 | 39.7 | 40.2 |
| Ash, $TiO_2$, percent | 38.6 | 38.2 | 34.6 | 33.5 | 35.5 | 35.2 | 35.6 | 34.6 | 33.9 |
| Mineral particles, percent | | | 4.2 | 5.0 | 1.9 | 1.0 | 1.7 | 5.1 | 6.3 |
| Abrasion tests on laminates: | | | | | | | | | |
| Cycles to end point | 93 | | 625 | 783 | 233 | 208 | 1.917 | 3,200 | 3,833 |
| Wear rate, gm./100 cycles | 0.077 | | 0.0111 | 0.0071 | 0.0281 | 0.0387 | 0.0033 | 0.0023 | 0.0018 |
| Printing evaluation: | | | | | | | | | |
| Densichron-decor | 30.0 | | 29.0 | 27.0 | 28.0 | 26.0 | 30.0 | 38.0 | 37.0 |
| Densichron-laminate | 13.5 | | 11.0 | 10.5 | 11.0 | 10.5 | 13.0 | 24.5 | 21.5 |

[3]Norbide is a mixture of tungsten carbide and boron carbide having a hardness in excess of 9 on the Moh scale.

EXAMPLES 9 THROUGH 16 INCL.

In this series of examples, the base layer as used in Examples 2 through 8 was used throughout. The top layer utilized the same hardwood fiber component in 1:1 ratios with alumina of different particle sizes to show the relationship between particle size and abrasion resistance of laminates, as well as relative print quality, other factors being held constant. Results are tabulated below.

| | Av. particle size, μ | Alumina in total decor, percent | Densichron-laminate | Abrasion cycles to E.P. | Resistance wear, g./100 cycles |
|---|---|---|---|---|---|
| Control | | 0 | 18.5 | 100 | 0.0710 |
| Example No.: | | | | | |
| 9 | 40 | 3.3 | 16.8 | 767 | 0.0091 |
| 10 | 40 | 4.6 | 16.3 | 900 | 0.0076 |
| 11 | 40 | 4.9 | 15.0 | 944 | 0.0070 |
| 12 | 60–65 | 3.5 | 16.5 | 1,050 | 0.0062 |
| 13 | 60–65 | 4.0 | 18.0 | 1,087 | 0.0056 |
| 14 | 75 | 2.7 | 16.7 | 210 | 0.0271 |
| 15 | 75 | 3.5 | 15.5 | 342 | 0.0142 |
| 16 | 90 | 2.5 | 15.8 | 450 | 0.0152 |

As may be seen, optimum abrasion resistance is obtained in the particle size range of 40 to 65 microns. In all

EXAMPLES 17 THROUGH 20

Using the base layer of Example 2, the top layer was varied by using a mixture of two different sized alumina powders, one being closely sized at 60 to 95 microns and the other being an unsized fraction having particles ranging from 1 to 60 microns, and a weight-average size of 40 microns. These were compared with laminates having closely sized 40 micron alumina in the top layer.

| Example number | 17 | 18 | 19 | 20 |
|---|---|---|---|---|
| Top layer composition: | | | | |
| Bleached hardwook pulp, percent | 50 | 50 | 50 | 60 |
| 40μ alumina | | 50 | 40 | |
| 60–65μ alumina | 33 | | | 26.4 |
| Unsized alumina | 17 | | 13.6 | |
| Physical properties: | | | | |
| Basis wt, base layer | 58.0 | 59.0 | 59.5 | 57.5 |
| Basis wt, top layer | 5.5 | 5.5 | 5.5 | 5.0 |
| Basis wt, total | 63.5 | 61.5 | 65.0 | 62.5 |
| $TiO_2$, percent | 36.2 | 36.2 | 36.2 | 36.4 |
| Alumina percent | 3.8 | 3.8 | 3.0 | 2.1 |
| Abrasion tests: | | | | |
| Cycles to end point | 550 | 833 | 664 | 625 |
| Wear rate, gm./100 cycles | 0.0090 | 0.0080 | 0.0106 | 0.0106 |
| Ink receptivity: Densichron-laminate | 18.0 | 16.5 | 16.0 | 16.8 |

From this data, it may be seen that closely sized 40 micron alumina gives somewhat better abrasion resistance than the mixture, although all these examples meet NEMA standards for Class A laminates.

EXAMPLES 21 THROUGH 25 INCL.

In this series of examples, using the base layer of Example 2, the ratio of fibers to 40 micron alumina was varied over wide limits. The following tabulation shows the results obtained.

| Example number | 21 | 22 | 23 | 24 | 25 |
|---|---|---|---|---|---|
| Top layer composition: | | | | | |
| Bl. hardwood fibers, percent | 80 | 70 | 40 | 20 | 0 |
| 40μ alumina, percent | 20 | 30 | 60 | 80 | 100 |
| Physical properties: | | | | | |

-continued

| Example number | 21 | 22 | 23 | 24 | 25 |
|---|---|---|---|---|---|
| Basis wt., base layer | 58.5 | 59.0 | 60.5 | 61.0 | 59.5 |
| Basis wt., top layer | 5.5 | 4.5 | 3.5 | 4.3 | 2.0 |
| Basis wt., total | 64.0 | 63.5 | 64.0 | 65.3 | 61.5 |
| $TiO_2$, percent | 36.5 | 37.1 | 37.7 | 37.2 | 38.6 |
| Alumina, percent | 2.2 | 2.4 | 3.4 | 4.9 | 2.2 |
| Abrasion tests: | | | | | |
| Cycles to end point | 442 | 552 | 787 | 1,210 | 810 |
| Wear rate, gm./100 cycles | 0.0131 | .0106 | .0070 | .0051 | .0066 |
| Ink receptivity: Densichron-laminate | 15.3 | 16.0 | 16.3 | 16.5 | 17.5 |

These examples show that, as the proportion of fibers decreases in the top layer, abrasion resistance generally increases. While Example 25, containing no fiber in the top layer shows a decrease in abrasion resistance, note that the weight of top layer applied is only 2 lbs. per 3000 sq. ft.

EXAMPLES 26 THROUGH 34 INCL.

In these examples, the base layer composition was the same and consisted of:

| | Parts |
|---|---|
| Bleached softwood sulfite pulp | 27.7 |
| Bleached hardwood sulfite pulp | 27.7 |
| Bleached softwood sulfate pulp | 27.7 |
| Titanium dioxide | 2.0 |
| Diatomaceous earth | 14.9 |
| Zinc oxide | 2.9 |
| Dyes to produce brown color | 6.49 |

This composition was processed in conventional paper-making equipment, and refined to a freeness of 425 ml. (Canadian Standard). It was delivered to the primary headbox of a paper machine and formed into a base layer of 60 lbs. per ream of 3000 sq. ft.

The top layer, applied over the base layer by a secondary headbox, consisted of bleached hardwood sulfite and closely sized 40 micron alumina (available from Micro Abrasives Corp. and identified as Microgrit WCA040). The amount of top layer applied as well as the ratio of fibers to alumina were varied as shown in the following tabulation.

The multi-layer decor papers produced in these examples were printed, saturated with a melamine resin and made into laminates according to Example 2. Tests of the papers and laminates are set forth in the following tabulation.

Figure 3:
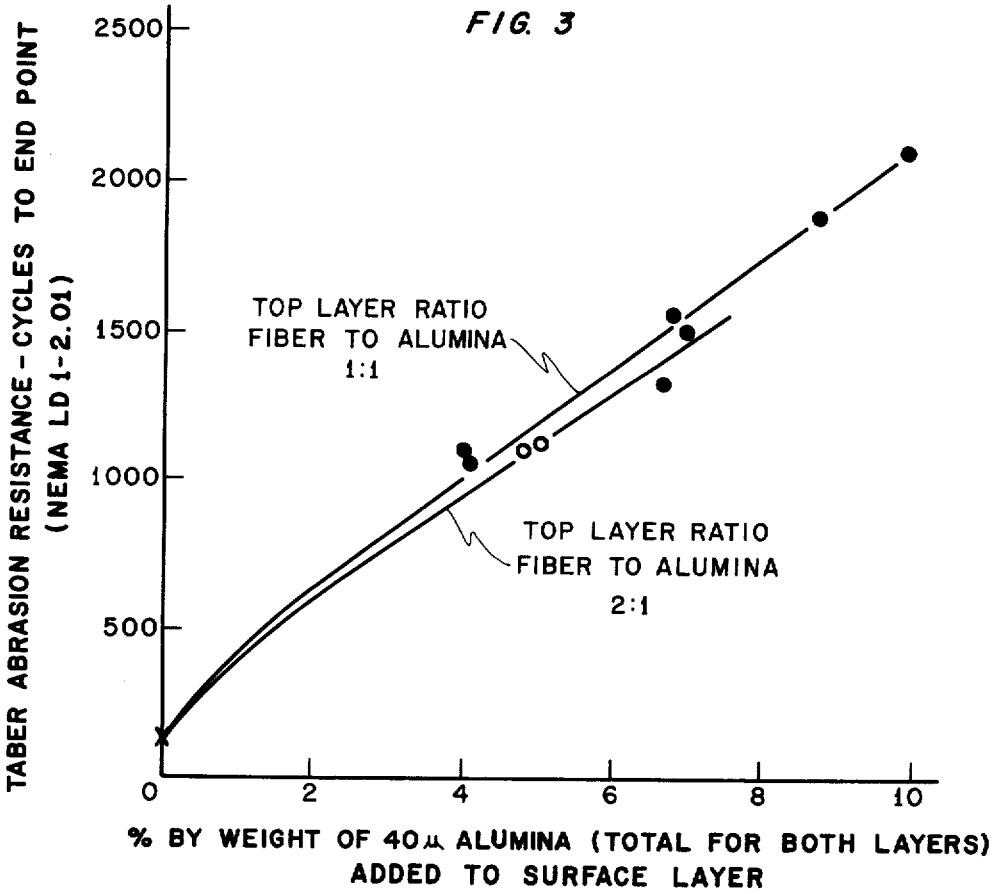
FIG. 3 is a graphical showing of abrasion resistance of the decorative laminates of this invention as a function of the amount of alumina added to the decor paper of this invention.

FIG. 3 has been constructed from the data obtained in these examples, and shows the relationship between abrasion resistance of the laminate and the amount of alumina in the top layer. Denischron data show that, in each case, ink receptivity of the double layer decor paper is improved over the control. Visual examination of the completed laminates confirms this. The improvement in printing quality is probably traceable to the presence of relatively fine hardwood fibers and closely sized mineral particles in the top surface of the double layer decor.

It is also interesting to note that, in each case, the final color of the laminate was indistinguishable from the final color of the laminate prepared from the control (base layer only), even though no coloring dyes or pigments were incorporated in the top layer. This indicates that the top layer has become essentially transparent following resin impregnation, pressing and curing.

EXAMPLE 35

In this example, the base layer of Example 2 was used. To this layer, while on the wire of a paper machine, was added an intermediate layer having a composition of 50 parts bleached hardwood sulfite fibers and 50 parts of 40-micron alumina to which was added a sufficient quantity of sequins cut from aluminum foil to yield approximately 100 sequins in each 10 sq. inches of the intermediate layer. Over the surface of the intermediate layer, while it and the base layer were still carried by the wire of the paper machine, a top layer of 50 parts bleached hardwood sulfite fibers and 50 parts 40-micron alumina was added by means of a third headbox. The resultant 3-layer product was pressed dried, calendered and printed to yield a multiple layer decor. The base layer had a basis weight of 60.5 lbs./3000 sq. ft., the intermediate layer a basis weight of 3.0 lbs./3000 sq. ft. and the top layer a basis weight of 2.8 lbs./3000 sq. ft. for a total of 66.3 lbs./3000 sq. ft.

This three layered decor was incorporated in a laminate according to Example 2. When tested, the laminate showed an abrasion resistance of 1500 cycles and a wear rate of 0.0046 gm./100 cycles.

EXAMPLES 36 THROUGH 38 INCL.

Using the base layer of Example 2, top layers using blends of bleached hardwood sulfite pulp and cotton linters were used, with 40 micron alumina as the abrasion resisting mineral particles. The results are tabulated below:

| | | Example number | | | | | | | | |
|---|---|---|---|---|---|---|---|---|---|---|
| | Control | 26 | 27 | 28 | 29 | 30 | 31 | 32 | 33 | 34 |
| Top layer composition: | | | | | | | | | | |
| Fibers, percent | | 50 | 50 | 50 | 50 | 50 | 50 | 50 | 67 | 67 |
| 40μ alumina, percent | | 50 | 50 | 50 | 50 | 50 | 50 | 50 | 33 | 33 |
| Physical properties: | | | | | | | | | | |
| Basis wt., base layer | 59.6 | 62.0 | 59.6 | 61.0 | 59.6 | 61.0 | 59.6 | 59.6 | 59.6 | 6.15 |
| Basis wt., top layer | | 4.9 | 7.0 | 8.0 | 8.2 | 9.0 | 12.0 | 13.9 | 8.4 | 8.5 |
| Basis wt., total | 59.6 | 66.9 | 66.6 | 69.0 | 67.8 | 70.0 | 71.6 | 73.5 | 68.0 | 70.0 |
| Total ash, percent | 20.2 | 22.9 | 23.8 | 24.9 | 24.3 | 24.4 | 25.5 | 26.3 | 23.0 | 23.2 |
| Ash, base, percent | 20.2 | 18.8 | 18.1 | 17.9 | 17.8 | 17.6 | 16.8 | 16.4 | 17.8 | 17.8 |
| Alumina, percent | 0 | 4.1 | 5.7 | 7.0 | 6.5 | 6.8 | 8.7 | 9.9 | 5.2 | 5.4 |
| Abrasion tests: | | | | | | | | | | |
| Cycles to E.P. | 130 | 1,100 | 1,100 | 1,500 | 1,300 | 1,575 | 1,900 | 2,125 | 1,140 | 1,150 |
| Wear rate, gm./100 c | .0650 | .0057 | .0055 | .0041 | .0044 | .0041 | .0040 | .0042 | .0063 | .0051 |
| Ink receptivity: | | | | | | | | | | |
| Densichron-decor | 41.0 | 39.0 | 36.0 | 35.5 | 37.0 | 36.0 | 35.5 | 33.5 | 36.0 | 36.0 |
| Densichron-laminate | 31.2 | 32.0 | 30.1 | 30.0 | 32.5 | 29.3 | 28.0 | 26.7 | 28.5 | 29.4 |

| | Example number | | | |
|---|---|---|---|---|
| | Control | 36 | 37 | 38 |
| Top layer composition: | | | | |
| Bleached hardwood pulp, percent | 0 | 20 | 35 | 67 |
| Cotton linters, percent | 0 | 30 | 15 | |
| 40μ alumina, percent | 0 | 50 | 50 | 33 |
| Physical properties: | | | | |
| Basis wt., base layer | 58.5 | 59.0 | 59.0 | 61.0 |
| Basis wt., top layer | | 4.0 | 3.8 | 2.8 |
| Basis wt., total | 58.5 | 63.0 | 62.8 | 63.8 |
| $TiO_2$, percent | 39.9 | 37.4 | 37.5 | 38.1 |
| Alumina, percent | 0 | 1.7 | 1.7 | 1.7 |
| Abrasion tests: | | | | |
| Cycles to end point | 74 | 683 | 663 | 535 |
| Wear rate, gm./100 cycles | .0716 | .0075 | .0092 | .0102 |
| Ink receptivity: | | | | |
| Densichron-decor | 31.0 | 31.0 | 31.2 | 30.8 |
| Densichron-laminate | 16.3 | 16.3 | 15.3 | 15.3 |

All the laminates had adequate levels of abrasion resistance and ink receptivity. Additionally, the laminates of Examples 36 and 37, each of which contained cotton linters in the surface layer, showed very acceptable post-formability, being capable of post forming to ½-inch radius bends with no perceptible cracking or crazing in the bend region. Both the control and Example 38 could not be post formed to ½-inch radius without objectionable cracking and/or crazing.

EXAMPLE 39

In this example, the printed multi-layer decor paper of Example 33 was saturated with 58% of a polyester resin, then pressed at 270° F. for 2 minutes at 200 p.s.i. The finished laminate was tested for its abrasion resistance in comparison with a similar laminate using the single layer printed decor of the control sample for Examples 26–34, with the following results:

| Abrasion resistance | Control | Example 39 |
|---|---|---|
| Cycles to end-point | 300 | 500 |
| Wear rate, gm./100 cycles | 0.068 | 0.0484 |

EXAMPLES 40 THROUGH 43

The printed multi-layer decors of Examples 28 and 33 were each saturated with a low pressure melamine resin and with a diallyl phthalate resin crosslinked with styrene. The low pressure melamine samples were pressed for 3.25 minutes at 300° F. and 300 p.s.i., while the diallyl phthalate samples were cured for 9 minutes at 240° F. under 50 p.s.i. with the following results:

| Example number | 40 | 41 | 42 | 43 | Control |
|---|---|---|---|---|---|
| Decor from example number | 28 | 33 | 28 | 33 | 39 |
| Resin used[1] | LPM | LPM | DAP | DAP | DAP |
| Cycles to end-point | 1.500 | 1.060 | 530 | 490 | 290 |
| Wear rate, gm./100 cycles | 0.0058 | 0.0073 | 0.0240 | 0.0314 | 0.0710 |

[1]LPM is low pressure melamine.
DAP is diallyl phthalate.

While the low pressure melamine is a harder resin than diallyl phthalate, both show marked improvement in abrasion resistance resulting from the decor of this invention.

EXAMPLES 44–45

Sheets of the printed multi-layer decor paper of Examples 28 and 33 were saturated with a self-crosslinking acrylic resin in latex form. The water was evaporated and the resin cross-linked by heating at 130° C. The resultant product was suitable for such applications as wear resistant book covers, or could be adhered to a base or core to provide a thicker, laminated structure.

Abrasion resistance of the cured sheets, prior to any laminating or adhering step was as follows:

| Example number | 44 | 45 | Control |
|---|---|---|---|
| Decor from example number | 33 | 28 | 39 |
| Percent acrylic resin | 32 | 34 | 34 |
| Cycles to end point | 400 | 600 | 140 |

Again, the marked improvement in abrasion resistance attained with the printed multi-layer decor of this invention is evident.

What is claimed is:

1. An abrasion resistant laminate comprising a core and a resin impregnated cured decorated surface paper, said surface paper, prior to resin impregnation comprising
   (a) a paper base layer;
   (b) a top layer integral with said base layer and comprising from about 2 to 100 percent by weight of abrasion resisting mineral particles having a hardness of from 7 to 10 on the Moh scale and an average particle size ranging from 10 to 75 microns, and
   (c) printing applied on the exposed outer surface of said top layer.

2. The abrasion resistant laminate of claim 1 wherein said resin is a thermosetting resin.

3. The abrasion resistant laminate of claim 1 wherein said top layer includes fibers.

4. The abrasion resistant laminate of claim [2] *3* wherein said top layer comprises from 10% to 50% of said mineral particles and from 90% to 50% of said fibers.

5. The abrasion resistant laminate of claim 1 wherein said mineral particles are alumina.

6. The abrasion rsistant laminate of claim 1 wherein said mineral particles are silica.

7. The abrasion resistant laminate of claim 1 wherein said mineral particles are silicon carbide.

8. The abrasion resistant laminate of claim 1 wherein said mineral particles are a mixture of tungsten carbide and borron carbide.

9. The abrasion resistant laminates of claim 1 wherein said top layer has a basis weight ranging from 1 to 20 lbs. per ream of 3000 sq. ft.

10. The abrasion resistant laminate of claim 1 wherein said base layer comprises fibers.

11. The abrasion resistant laminate of claim 9 wherein said base layer has a basis weight ranging from 10 to 100 lbs. per ream of 3000 sq. ft.

12. The abrasion resistant laminate of claim 1 wherein said base layer comprises fibers and opacifying pigments, and has a basis weight ranging from 30 to 100 lbs. per ream of 3000 sq. ft. and said top layer comprises from 10% to 50% alumina having a particle size distribution of 96% in the size range of 20 to 60 microns and 90% to 50% of bleached hardwood fibers, said top layer having a basis weight ranging from 4 to 14 lbs. per ream of 3000 sq. ft.

*13. An abrasion resistant laminate comprising a core and a resin impregnated printed decor paper, said printed decor paper comprising:*

*(a) a base paper layer of fibers and opacifying pigments; and*

*(b) integral with said base paper layer a printed layer comprising a mixture of abrasion resisting mineral particles having a hardness of 7 to 10 on the Moh scale and print receptive fibers, the fibers and abrasion resisting mineral particles being present in said printed layer in an amount and size to impart printability to the printed surface of the printed layer and to provide such abrasion resistance to said decor paper that upon lamination, without the presence of overlay paper, the resulting laminate has a wear rate of under 0.08 gm/100 cycles and a minimum of 400 cycles in the NEMA Method LD1-2.01 abrasion test, the printing on said printed layer being on the surface opposite the surface integral with said base layer.*

*14. The abrasion resistant laminate of claim 13 wherein said base paper layer has a dry basis weight ranging from 30 to 100 lbs. per ream of 3000 sq. ft. and said printed layer has a dry basis weight ranging from 4 to 14 lbs. per ream of 3000 sq. ft.*

*15. The abrasion resistant laminate of claim 13 wherein said printed layer includes a small amount of adhesive.*

*16. The abrasion resistant laminate of claim 15 wherein said adhesive is starch.*

*17. The abrasion resistant laminate of claim 13 wherein said decor paper includes a thin fiber layer over said printable layer.*

*18. An abrasion resistant laminate comprising a core and a resin impregnated printed decor paper, said printed decor paper comprising:*

*(a) a base paper layer;*

*(b) integral with said base paper layer a printed layer comprising a mixture of abrasion resisting mineral particles having a hardness of 7 to 10 on the Moh scale and print receptive fibers, the fibers and abrasion resisting mineral particles being present in said printed layer in an amount and size to impart printability to the printed layer and to provide such abrasion resistance to said decor paper that upon lamination, without the presence of overlay paper, the resulting laminate has a wear rate of under 0.08 gm/100 cycles and a minimum of 400 cycles in the NEMA Method LD1-2.01 abrasion test; and*

*(c) the printing on said printed layer being on the surface opposite the surface integral with said base paper layer.*

*19. The abrasion resistant laminate of claim 18 wherein said base paper layer has a dry basis weight ranging from 30 to 100 lbs. per ream of 3000 sq. ft. and said printed layer has a dry basis weight ranging from 4 to 14 lbs. per ream of 3000 sq. ft.*

*20. An abrasion resistant laminate comprising a core and a resin impregnated printed decor paper, said printed decor paper comprising:*

*(a) a base paper layer of fibers and opacifying pigments; and*

*(b) integral with said base paper layer a printed layer comprising a mixture of abrasion resisting alumina particles, print receptive fibers and starch, the fibers and abrasion resisting alumina particles being present in said printed layer in an amount and size to impart printability to the printable surface of the printed layer and to provide such abrasion resistance to said decor paper that upon lamination, without the presence of overlay paper, the resulting laminate has a wear rate of under 0.08 gm/100 cycles and a minimum of 400 cycles in the NEMA Method LD1-2.01 abrasion test, the printing on said printed layer being on the surface opposite the surface integral with said base paper layer.*

*21. The abrasion resistant laminate of claim 20 wherein said base paper layer has a dry basis weight ranging from 30 to 100 lbs. per ream of 3000 sq. ft. and said printed layer has a dry basis weight ranging from 4 to 14 lbs. per ream of 3000 sq. ft.*

*22. The abrasion resistant laminate of claim 20 wherein said decor paper includes a thin fiber layer over said printed layer.*

* * * * *